United States Patent
Adkins (10) Patent No.: US 12,416,327 B2
(45) Date of Patent: Sep. 16, 2025

(54) BEARING ASSEMBLY FOR A DUAL ROD DIRECTIONAL DRILLING APPARATUS AND METHOD OF USE

(71) Applicant: Hunting Energy Services, LLC, Houston, TX (US)

(72) Inventor: Gregory Lynn Adkins, Lafayette, LA (US)

(73) Assignee: Hunting Energy Services, LLC, Houston, TX (US)

( * ) Notice: Subject to any disclaimer, the term of this patent is extended or adjusted under 35 U.S.C. 154(b) by 327 days.

(21) Appl. No.: 18/307,940

(22) Filed: Apr. 27, 2023

(65) Prior Publication Data

US 2024/0360868 A1    Oct. 31, 2024

(51) Int. Cl.
| | |
|---|---|
| *F16C 19/08* | (2006.01) |
| *E21B 7/04* | (2006.01) |
| *E21B 21/00* | (2006.01) |
| *F16C 33/66* | (2006.01) |

(52) U.S. Cl.
CPC .............. *F16C 19/08* (2013.01); *E21B 7/046* (2013.01); *F16C 33/6685* (2013.01); *E21B 21/00* (2013.01); *F16C 2352/00* (2013.01)

(58) Field of Classification Search
CPC ...... F16C 19/08; F16C 2352/00; E21B 7/046; E21B 4/003
See application file for complete search history.

(56) References Cited

U.S. PATENT DOCUMENTS

| | | | | |
|---|---|---|---|---|
| 4,198,104 | A | * | 4/1980 | Crase .................. E21B 23/0419 384/228 |
| 4,260,031 | A | * | 4/1981 | Jackson, Jr. .............. E21B 4/02 415/111 |
| 2003/0205409 | A1 | * | 11/2003 | Koch ....................... C12N 9/93 175/26 |
| 2015/0368985 | A1 | * | 12/2015 | Eppink ..................... E21B 7/00 175/320 |
| 2018/0112466 | A1 | * | 4/2018 | von Gynz-Rekowski ................... E21B 4/02 |
| 2022/0251941 | A1 | * | 8/2022 | Ward ..................... E21B 7/046 |

* cited by examiner

*Primary Examiner* — Theodore N Yao
(74) *Attorney, Agent, or Firm* — Whitaker Chalk Swindle & Schwartz PLLC; Charles D. Gunter, Jr.

(57) ABSTRACT

A rock housing for horizontal directional drilling machine includes a cylindrical housing body with walls defining a longitudinal cavity. A bearing assembly is provided as a part of the housing and is located above a bit box region of the housing. The bearing assembly is lubricated by drilling mud which flows through the drill string of the drilling machine, which mud flow is normally used for cooling the drill bit and removing cuttings. A portion of the drilling mud is diverted and passes through a gap formed between the bearing races of the bearing assembly, the gap being sized so as to create the necessary back pressure to divert the needed flow of drilling mud to the assembly.

7 Claims, 6 Drawing Sheets

BEARING ASSEMBLY FOR A DUAL ROD DIRECTIONAL DRILLING APPARATUS AND METHOD OF USE

BACKGROUND OF THE INVENTION

1. Field of the Invention

The present invention relates generally to the bearing assembly used in a horizontal directional drilling apparatus and, in particular, to a mud-lubed bearing assembly in which the bearing assembly itself acts as a metering device for controlling the flow of mud through the bearing to provide lubrication for the bearing

2. Description of the Prior Art

The conventional directional drilling apparatus (horizontal directional drilling or HDD apparatus) generally includes a series of drill rods joined end to end by threaded connections or joint couplings to form a drill string. The drill string is typically pushed or pulled though the earth by means of a hydraulic cylinder or gear rack mounted on the HDD machine. A drill bit or head is attached to the end of the drill string with a coupling and will typically include a fluid nozzle for delivering a drilling fluid to assist in the boring operation. In other applications, tools such as reamers, impact machines, pipe bursters, and the like are attached to the end of a drill string with a threaded connection or coupling.

Dual drill rod drilling systems are known in the industry for use in directional drilling, such systems having an inner rod and an outer rod. A typical dual rod drilling system is used to drive into the ground a series of drill rods joined end-to-end to form a drill string. At the end of the drill string is a rotating drilling tool or drill bit. A dual rod drilling system typically includes a first drive mechanism that controls rotation of a drill bit and a second drive mechanism that controls rotation of a steering element. When a straight hole is drilled with a dual rod drilling system, the first and second drive mechanisms are concurrently operated as the drill string is forced into the ground. When a change in direction is needed, the steering element is axially misaligned with the drill string. The drive mechanism that controls the steering element is stopped and the drill string is thrust further into the ground while the drive mechanism that controls the drill bit is rotated. This causes the drill bit to deviate from a straight path and follow the direction dictated by the steering element.

Dual rod drilling systems of this general type use drilling fluid that is passed internally within the drill rods for cooling of the drill bit and also for transporting cuttings within the drill hole. Also, to drive the rotation of the drill string, a gearbox having one or more motors has traditionally been used. The gearbox can include a gear arrangement that transfers power from the motor or motors to the inner and out drill rods of the dual rod drilling system. Drilling fluid has also been traditionally introduced at the gearbox to the drill string; however, the drilling fluid was isolated from the internal components of the gearbox.

One commercially available design of dual rod system features what is called a "rock housing" or "drill head housing" in the drill string. The rock housing has one end for connection in the drill string going up hole and an opposite end which terminates in a bearing mandrel bit box for connection to the drill bit in the down hole direction. A bearing assembly is located above the bit box containing a plurality of bearing races and ball bearings. The rock housing also typically includes a section for housing a sonde transmitter which fits beneath a locking lid, allowing access to the sonde for maintenance or other reasons.

In the presently available commercial HDD designs of the type under consideration, the bearing assembly is typically a sealed assembly which is greased periodically to provide the needed lubricant. While this provides a workable solution, the sealed bearing approach adds cost and complexity to the design.

In the area of oil field motors for drilling oil and gas wells, the bearing assemblies have also sometimes been mud-lubricated. However, this was accomplished by using additional parts, such as a separate sleeve and piston arrangement, to help meter drilling fluid that passes through the bearings, which again contributed to the complexity of the designs.

Thus, despite the advances that have been made in the art of dual rod, directional drilling systems, there continues to exist a need for improvements in the component parts of such systems, such as the bearing assemblies used in such systems.

SUMMARY OF THE INVENTION

An improved bearing assembly is shown for use in a dual rod directional drilling system which is useful for horizontal directional drilling activities, sometimes referred to as "trenchless drilling." As has been mentioned, these types of drilling activities are commonly used, e.g., to install utilities around immovable objects, such as roadways, rivers and/or lakes, etc., and may be seen being used to tunnel under sidewalks and city streets to install such things as fiber optic cables, or other electrical utility lines. The "rock housing" of such systems includes a bearing assembly above the bit box. The invention is directed toward an improved bearing assembly for such systems and particularly to the method of lubricating such a bearing assembly and the associated structure for accomplishing this task.

The rock housing design of the invention uses mud-lubed bearings. Drilling mud (fluid) flows through the bearings and keeps the bearing lubricated and cooled. There are no seals and no grease is involved. A small amount of the total drilling fluid is diverted to the bearings by means of back-pressure from the drilling fluid.

The bearing assembly of the invention, as will be further described, is a part of a rock housing used in a horizontal directional drilling apparatus, where the drilling apparatus includes a horizontal boring machine having a frame, a rotary machine supported on the frame, a drill string and a directional boring head. The drill string has a first end, which is operatively connected to the rotary machine to drive the rotation of the drill string, and a second end, which is attachable to the directional boring head. The drill string itself is comprised of a plurality of lengths of dual-rod pipe which include passageways for conducting drilling mud to the boring head to cool the head and remove cuttings produced during drilling operations.

The rock housing is located in the drill string at a lower extend thereof and has an upper connecting end for connection in the drill string and an opposite, lower end. The lower end includes a lower housing and a bearing mandrel bit box for connection to the boring head, the lower housing containing the bearing assembly and also containing an internal flow path for the passage of drilling mud. The bearing assembly is lubricated by special passageways formed within the bearing assembly which divert a portion of the flow of drilling mud passing through the drill string and through the rock housing to the boring head, the internal passageways serving as a metering device for the flow of drilling mud through the bearing assembly.

Preferably, the bearing assembly includes a plurality of inner bearing races and a plurality of companion outer bearing races, the inner and outer races having a plurality of bearing elements located therebetween. A first inner race and its companion first outer race are intentionally machined so that a small gap exists between the races when the races are assembled with the bearing elements located therebetween. The size of this gap between the bearing races can be adjusted to provide a desired amount of back pressure which controls the amount of drilling mud that is allowed to pass through the bearing assembly, the remaining flow being encouraged to flow toward the boring head. For example, the gap between the first pair of inner and outer races can be less than about 0.015 inches between the first inner and outer races. The bearing assembly is also characterized by the absence of any type of sealed cavity containing oil or grease lubricant, but instead relies solely on the flow of drilling mud through the bearing assembly.

Most preferably, the bearing assembly is made up of five or more companion inner and outer races separated by a plurality of ball bearings, and wherein the gap which exists between the first inner race and its companion first outer race increases in size to a larger gap at each of the remaining inner and outer races of the bearing pack, in the downhole direction toward the boring head.

An improved method is also shown for lubricating a bearing assembly for a rock housing used in a horizontal directional drilling apparatus, the method comprising the steps of:

providing a bearing assembly for a horizontal boring machine having a frame, a rotary machine supported on the frame, a drill string and a directional boring head, where the drill string has a first end, which is operatively connected to the rotary machine to drive the rotation of the drill string, and a second end, which is attachable to the directional boring head, the drill string itself being comprised of a plurality of lengths of dual-rod pipe which include passageways for conducting drilling mud to the boring head to cool the head and remove cuttings produced during drilling operations;

wherein a rock housing is located in the drill string at a lower extend thereof, the rock housing having an upper connecting end for connection in the drill string and an opposite, lower end, the lower end including a lower housing and a bearing mandrel bit box for connection to the boring head, the lower housing containing the bearing assembly and also being provided with an internal flow path for the passage of drilling mud; and wherein the bearing assembly is provided with special lubricant passageways formed within the bearing assembly which divert a portion of the flow of drilling mud passing through the drill string and through the rock housing to the boring head, the internal passageways serving as a metering device for the flow of drilling mud through the bearing assembly.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Directional drilling systems of the type referred to above are sometimes referred to as "trenchless drilling," systems and are commonly used, e.g., to install utilities around immovable objects, such as roadways, rivers and/or lakes, etc. They may often be seen being used to tunnel under sidewalks and city streets to install such things as fiber optic cables, or other electrical utility lines.

The boring machine used in conventional horizontal boring techniques is thus commonly used to push and/or rotate a drill string, the drill string carrying a directable drill bit to achieve an underground path or direction through which a conduit or utility device can be installed. A sonde follows the drill bit as it is directed around, over or under obstructions. The sonde transmits electronic positioning signals to a worker vertically above the sonde, for example, by way of a hand-held complementary receiving device.

The particular class of drilling machines which utilize the rock housing of the invention include a horizontal boring machine comprising a frame, a rotary machine supported on the frame, a drill string and a directional boring head. The drill string has a first end, which is operatively connectable to the rotary machine to drive the rotation of the drill string, and a second end, which is attachable to the directional boring head. The drill string itself is comprised of a system of pipe joints connecting lengths of drill pipe. These type systems are sold commercially by Vermeer™ and Ditch Witch™, as well as others in the HDD industry and will be readily familiar to those skilled in the relevant arts.

Figure 7:
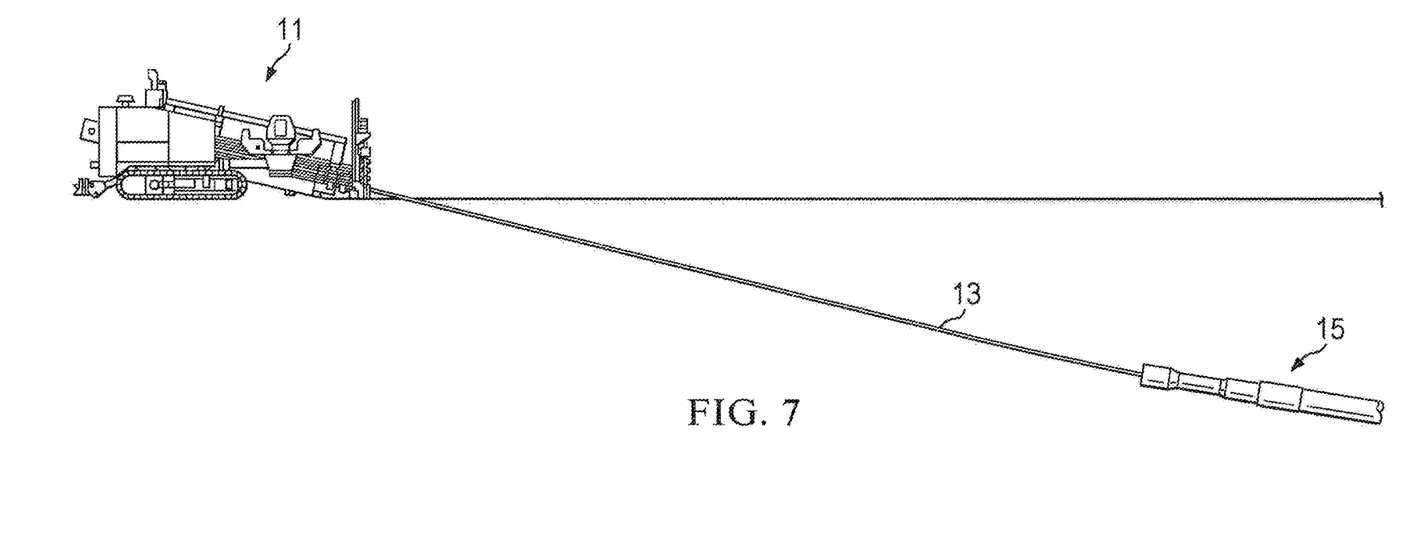
FIG. 7 is a simplified, schematic illustration of a horizontal directional drilling machine of the type which would utilize the improved bearing assembly of the invention.

Turning first to FIG. 7, there is shown a simplified representation of a horizontal directional drilling (HDD) machine 11, the machine being shown driving a drill string 13 into the ground. The distal end of the drill string includes a drill tool assembly, illustrated in simplified fashion as 15. A coupling fits between an end of the drill string 13 and the drill tool assembly 15. Particularly for rock drilling applications, "dual-member" drill string systems are preferred, sometimes referred to as "dual-rod" systems. Dual-member drill strings are comprised of a plurality of pipe joints, each of which comprises an inner member supported inside an outer pipe or member. The inner member of the drill pipe constantly drives rotation of the boring head to excavate the formation, while the outer member of the drill pipe is selectively rotated to align the steering mechanism to change the direction of the borehole while the rotating bit continues to drill. Typical systems of this type are shown in U.S. Pat. No. 5,490,569, issued Feb. 13, 1996, entitled Directional Boring Head With Deflection Shoe, and in RE38,418, reissued Feb. 10, 2004, entitled Dual Member Pipe Joint for a Dual Member Drill String, by way of example.

In one type of dual-rod drilling system known in the industry, the ends of both the inner member and outer members of a dual member drill string are threaded. Thus, making up and breaking out pipe joints in a dual member drill string system is more time consuming requiring two pipe connections instead of one for each joint. In another type of dual-rod drilling system, the time required to make and break pipe joint connections is reduced by providing, for example, a "slip fit" connection at each end of the inner member and a threaded connection at each end of the outer pipe member. This single-action connection is achieved by forming the ends of the inner members in a particular shape which permits, for example, axial sliding connection of a like joint to form a connector-free, torque-transmitting connection.

U.S. Pat. No. 10,167,680, issued Jan. 1, 2019, to Adkins, shows a threaded connection for connecting a removable downhole tool assembly to a drill string. The threaded connection has a downhole end portion configured to interface with the removable downhole tool assembly and an up-hole end portion opposed to the downhole end portion. The up-hole end portion is configured to interface with the drill string as part of a torque-less coupling using a special adapter body.

This rather detailed discussion of dual-rod directional drilling (HDD) machines of the type used for "trenchless drilling," and commonly used, e.g., to install utilities around immovable objects, such as roadways, rivers and/or lakes, etc., is intended to specifically distinguish oil and gas well drilling operations, some of which use "mud-motors" in directional drilling activities. Obviously, the stresses and forces involved in drilling, for example, an oil well, differ considerably from those involved in the type of HDD activities envisioned with the use of the present invention. There are other important structural differences, as well.

Figure 1:
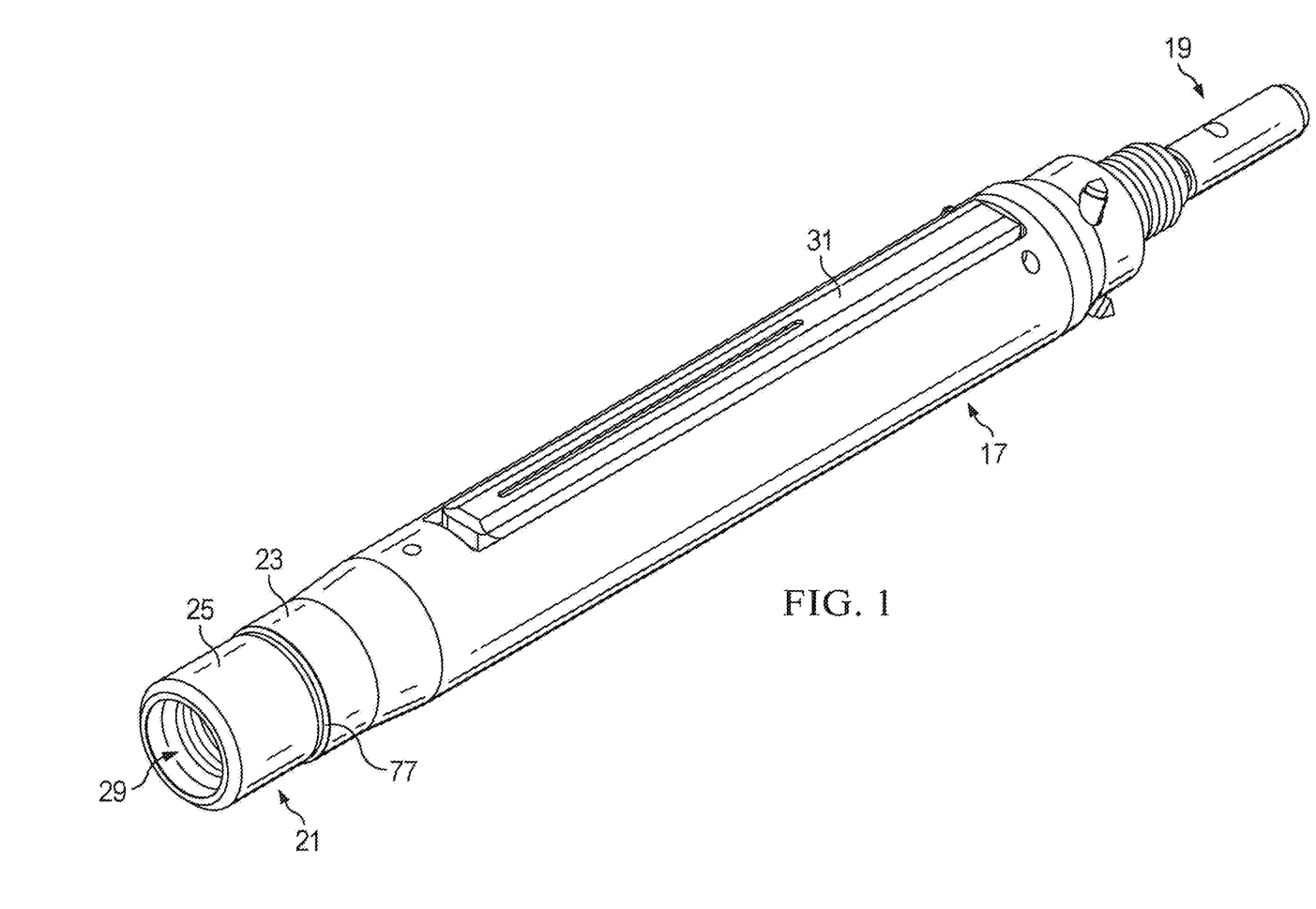
FIG. 1 is a perspective view of the rock housing of the invention showing the outer components thereof.

Turning now to FIG. 1, there is shown a "rock housing" of the invention, designated generally as 17. The rock housing 17 will be located in the drill string at a lower extent thereof. The rock housing 17 has an upper connecting end 19 for connection in the drill string and an opposite, lower end 21. The lower end includes a lower housing 23 and a bearing mandrel bit box 25 for connection to the boring head (drill bit). The lower housing 23 contains the bearing assembly (shown in exploded fashion as 27 in FIG. 3). The lower housing 23 is also provided with an internal flow path 29 for the passage of drilling fluid (mud). The drilling mud provides lubrication for the drill bit and also serves as the medium for removing cuttings from the borehole as drilling proceeds. The particular rock housing shown in FIG. 1 has a removable locking lid 31 which provides access to the steering sonde (not shown).

Figure 2:
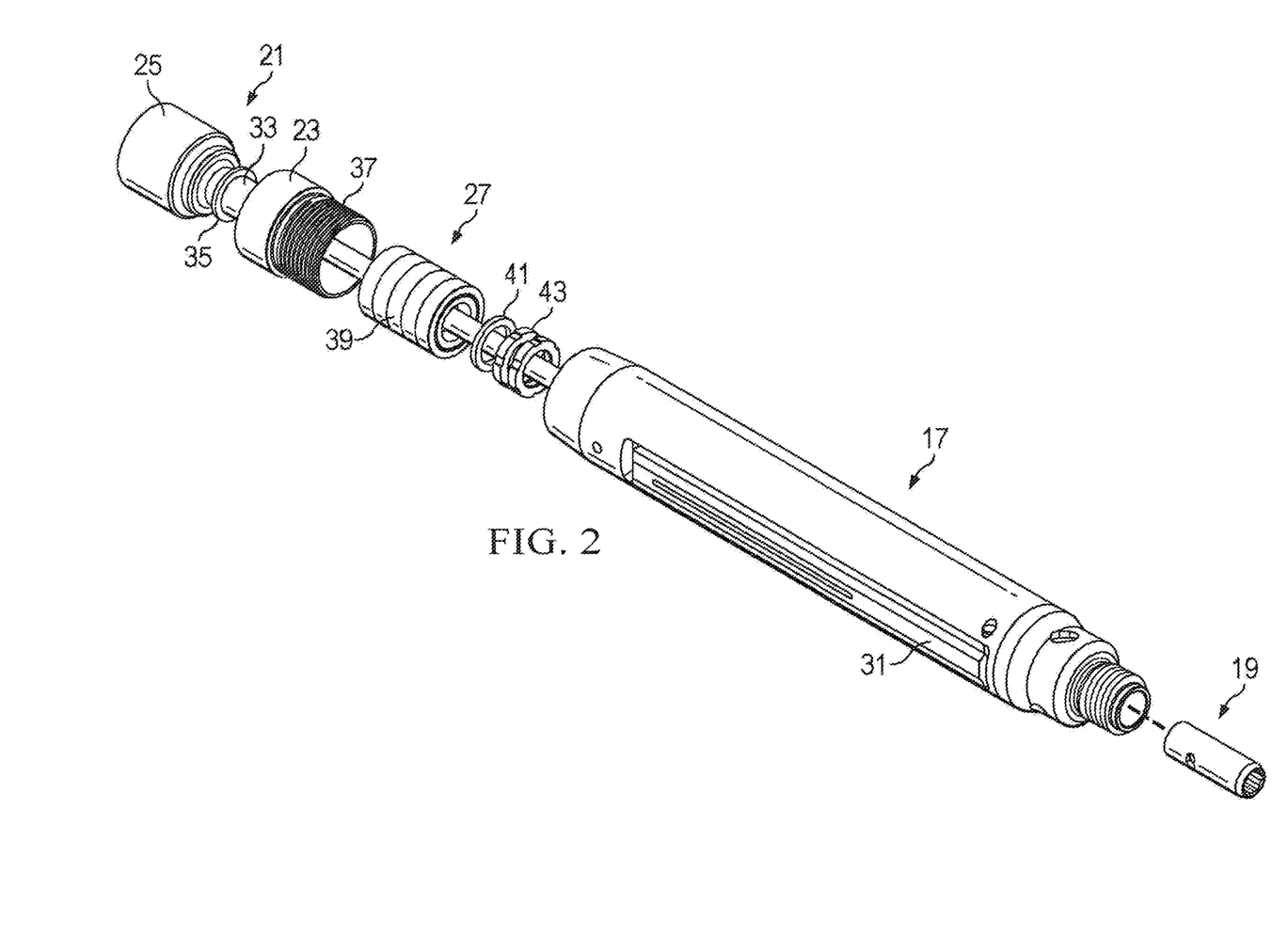
FIG. 2 is a partly exploded view of the rock housing of FIG. 1.

FIG. 2 shows the lower housing with the bearing assembly 27 of the invention being shown in exploded fashion. As will be explained more fully in the description which follows, the bearing assembly 27 is lubricated by special passageways formed within the bearing assembly which divert a portion of the flow of drilling mud passing through the drill string and through the rock housing to the boring head. The internal passageways serve as a metering device for the flow of drilling mud through the bearing assembly 27.

Figure 3:
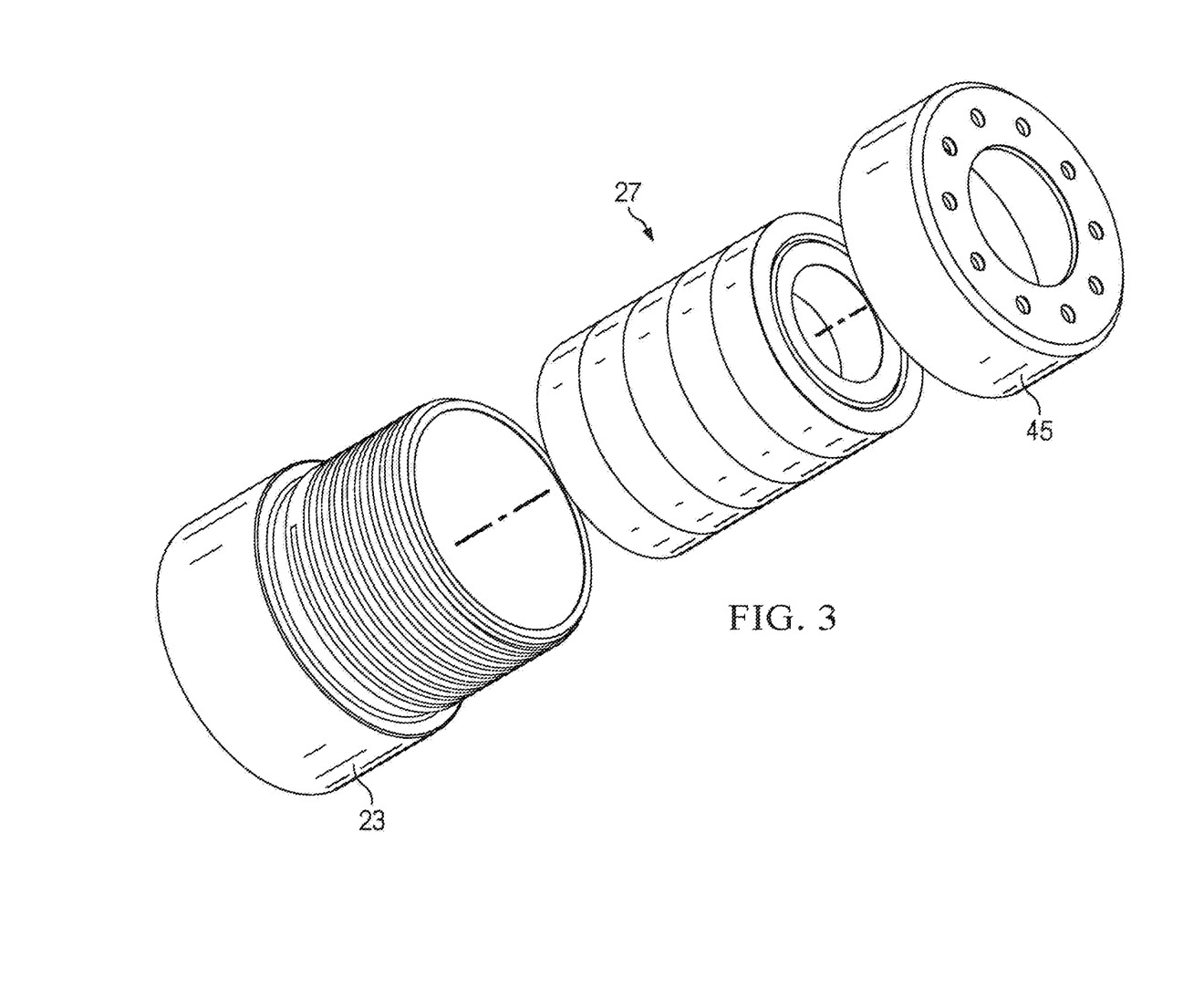
FIG. 3 is an isolated view of the bearing assembly used in the rock housing of FIG. 1, shown in exploded fashion.

As can be seen in FIG. 2, the rock housing 17 contains the bearing mandrel 33 which carries a front bearing spacer 35. The lower housing 23 has an outer threaded extent 37 which has left hand threads, the interior of which receives the bearing set (39 in FIG. 2). The bearing set 39 is followed by a rear bearing spacer 41 and spanner nuts 43. FIG. 3 shows the lower housing 23 and bearing set 27 in isolated, exploded fashion.

Figure 6:
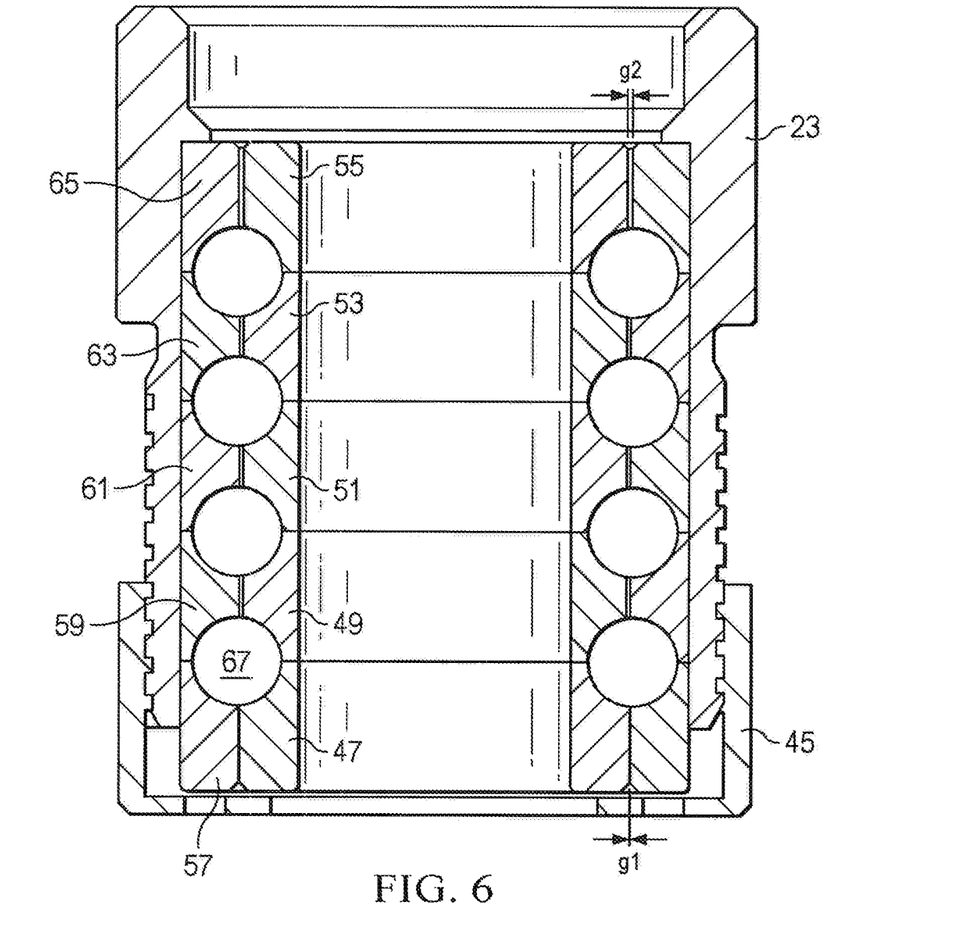
FIG. 6 is an isolated cross sectional view of the bearing region of the rock housing showing the relative gap regions between the inner and outer bearing races which form the flow path for the mud lubricant.

With reference now to FIG. 6, the bearing assembly, in the assembled state, is shown in cross section. The bearing assembly includes a plurality of inner bearing races 47, 49, 51, 53, 55, and a plurality of outer bearing races 57, 59, 61, 63 and 65. In the example shown, there are five inner and five outer races for a total of ten races in the bearing pack. As can be seen in FIG. 6, the inner and outer bearing races have a plurality of bearing elements (such as element 67) located therebetween. In the case of the exemplary bearing pack shown in FIG. 6, there are a total of sixty four individual ball bearings 67 making up the bearing elements.

It will also be appreciated from FIG. 6 that the first inner race 47 and its companion first outer race 57 are intentionally machined so that a gap ("$g_1$") exists between the races when the races are assembled with the bearing elements located therebetween. Thus, as shown in FIG. 6, there is a very small gap (illustrated as "$g_1$") between the inner and outer bearing races, which gap increases in size in the subsequent inner and outer bearing race pairs, i.e., in the direction of the lower housing 23 and the drill bit. The size of the gaps between the bearing races can be adjusted to provide a desired amount of back pressure which controls the amount of drilling mud that is allowed to pass through the bearing assembly, the remaining flow being encouraged to flow toward the boring head. Note that the retainer cap 45 shown in FIGS. 3 and 6 is an assembly device used during the assembly of the tool, but is not present in the final, assembled device.

In the example shown, the gap between the bearing races is less than about 0.015 inches between the first pair of inner and outer races. The gap on the other end of the bearing pack and also the gap between the inner and outer races between all of the remaining rows of bearings is typically about 0.100 inches, or more. This type of exemplary spacing allows drilling mud to flow through the bearings, to lubricate and cool the bearings. Typically, on mud lube bearings of the type used in oil and gas mud motors, this 0.100 inch or greater gap exists between all of the inner and outer races and the metering of mud is controlled in an entirely different manner.

The bearing assembly of the invention is thus characterized by the absence of any type of sealed cavity containing oil or grease lubricant, but instead relies solely on the flow of drilling mud through the bearing assembly to provide lubrication.

Figure 4:
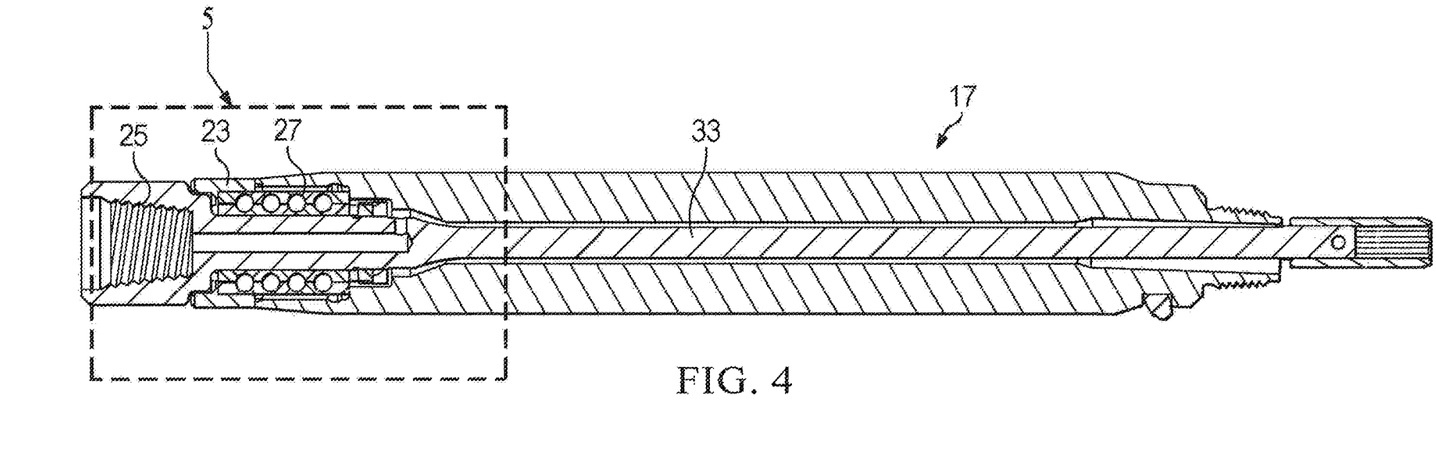
FIG. 4 is simplified sectional side view of the rock housing of the invention showing the ball bearings in their respective bearing races.
Figure 5:
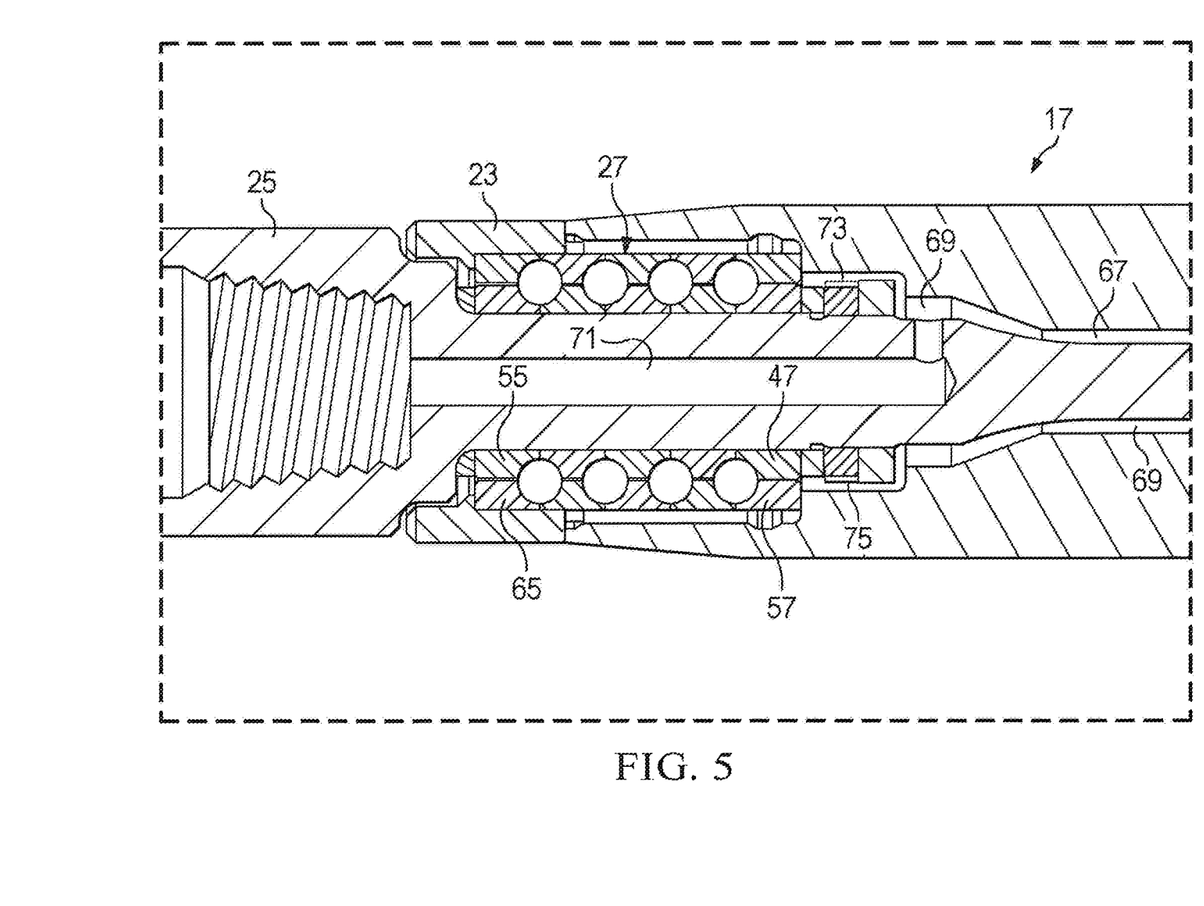
FIG. 5 is a close-up, side cross sectional view of the bearing assembly of the invention, taken from the region illustrated as "5" in FIG. 4, showing the direction of flow of the mud lubricant.

FIGS. 4 and 5 will be used to explain the flow of drilling mud through the bearing assembly 27. FIG. 4 shows the rock housing in cross section. FIG. 5 shows the bearing pack in enlarged fashion for ease of understanding. With reference to FIG. 5, the entering drilling mud would be flowing through the regions 67, 69 from the drilling machine. The majority of the fluid would continue from region 67 through the downward port 69 to the horizontal region 71 where it would continue on to ultimately lubricate the drill bit located inside the bit box 25.

However, it will also be appreciated from FIG. 5 that a portion of the drilling mud flows through the smaller passageways 73, 75, where it then enters the small gap "$g_1$" between the first inner and outer bearing races, 47 and 57, respectively. As previously described, the gap "$g_1$" increases in size from the first set of bearing races 47, 57 in the direction of the last set of races, in this case bearing races 55, 65.

In operation, for a typical example, ¼ inch discharge nozzles are used on the tricone or PDC drilling bit for purposes of this discussion. This is typically enough resistance to create fluid back pressure that will feed the mud lube bearings. Before the initial bore, with a bit installed, the inner rod is rotated at approximately 10 rpm. The flow of drilling mud is increased until a small amount of drilling fluid can be seen exiting the rock housing at the point 77 in FIG. 1, which is in front of the lower housing 23 and behind the bit box 25 on the bearing mandrel. Once a small stream has been established, the operator should note the fluid rate (gpm and pressure). This should be the minimum amount of flow used during drilling. If mud flows through the bit and the operator is unable to establish a small stream of fluid through the bearing pack, it may be necessary to increase the mud flow or to reduce the orifice size in the drill bit. Preferably 90-95% of the drilling mud should exit through the drill bit with 5-10% exiting through the bearing pack. This type of flow rate has been found to be satisfactory for providing adequate lubrication to the bearing assembly.

An invention has been provided with several advantages. The bearing assembly for an HDD apparatus of the invention uses the drilling mud passing through the system for lubrication, rather than using a separate sealed cavity containing oil or grease lubricant. The bearing system uses a specially sized gap in the area of the bearing races to divert a portion of the flow of drilling mud to the bearing assembly to lubricate the assembly. This design does not require a separate sleeve and piston or additional components as were used in some prior art oil and gas well drilling mud motors. As such, it only requires machining of the bearing components already present and does not add an additional component or add to the overall expense of the system. It also eliminates the possibility that such additional components might add to the maintenance requirements of the drilling system. The system is economical to manufacture and results in overall cost savings as compared to sealed grease type lubricating systems.

While the invention has been shown in only one of its forms, it will be appreciated that it is not thus limited, but is susceptible to various changes and modifications without departing from the spirit thereof.

What is claimed is:

1. A bearing assembly for a rock housing used in a horizontal directional drilling apparatus, the bearing assembly comprising:

a horizontal boring machine having a frame, a rotary machine supported on the frame, a drill string and a directional boring head, where the drill string has a first end, which is operatively connected to the rotary machine to drive the rotation of the drill string, and a second end, which is attachable to the directional boring head, the drill string itself being comprised of a plurality of lengths of dual-rod pipe which include passageways for conducting drilling mud to the boring head to cool the head and remove cuttings produced during drilling operations;

wherein the rock housing is located in the drill string at the second end thereof, the rock housing having an upper connecting end for connection in the drill string and an opposite, lower end, the lower end including a lower housing and a bearing mandrel bit box for connection to the directional boring head, the lower housing containing the bearing assembly and also containing an internal flow path for the passage of drilling mud;

wherein the bearing assembly is lubricated by special passageways formed within the bearing assembly which divert a portion of the flow of drilling mud passing through the drill string and through the rock housing to the directional boring head, the special passageways serving as a metering device for the flow of drilling mud through the bearing assembly;

wherein the bearing assembly includes a plurality of inner bearing races and a plurality of companion outer bearing races which comprise a bearing pack for the bearing assembly, the inner and outer bearing races having a plurality of bearing elements located therebetween, and wherein a first inner race and its companion first outer race are intentionally machined so that a gap of a predetermined width exists between the first inner race and its companion first outer race when the first inner race and its companion first outer race are assembled with the bearing elements located therebetween, the gap being about 0.015 inches or less;

wherein the size of the gap between the bearing races can be adjusted to provide a desired amount of back pressure which controls the amount of drilling mud that is allowed to pass through the bearing assembly, the remaining flow being encouraged to flow toward the boring head; and wherein the gap between the remaining pairs of races in the bearing pack are is about 0.100 inches or more.

2. A bearing assembly for a rock housing used in a horizontal directional drilling apparatus, the bearing assembly comprising:

a horizontal boring machine having a frame, a rotary machine supported on the frame, a drill string and a directional boring head, where the drill string has a first end, which is operatively connected to the rotary machine to drive the rotation of the drill string, and a second end, which is attachable to the directional boring head, the drill string itself being comprised of a plurality of lengths of dual-rod pipe which include passageways for conducting drilling mud to the boring head to cool the head and remove cuttings produced during drilling operations;

wherein the rock housing is located in the drill string at the second end thereof, the rock housing having an upper connecting end for connection in the drill string and an opposite, lower end, the lower end including a lower housing and a bearing mandrel bit box for connection to the directional boring head, the lower housing containing the bearing assembly and also containing an internal flow path for the passage of drilling mud;

wherein the bearing assembly is lubricated by special passageways formed within the bearing assembly which divert a portion of the flow of drilling mud passing through the drill string and through the rock housing to the directional boring head, the special passageways serving as a metering device for the flow of drilling mud through the bearing assembly;

wherein the bearing assembly includes a plurality of inner bearing races and a plurality of companion outer bearing races which comprise a bearing pack for the bearing assembly, the inner and outer bearing races having a plurality of bearing elements located therebetween, and wherein a first inner race and its companion first outer race are intentionally machined so that a gap of a predetermined width exists between the first inner race and its companion first outer race when the first inner race and its companion first outer race are assembled with the bearing elements located therebetween, the gap being about 0.015 inches or less;

wherein the bearing elements are a plurality of ball bearings; and wherein the bearing assembly is made up of five or more companion inner and outer races separated by a plurality of all bearings, and wherein the gap which exists between the first inner race and its companion first outer race is smaller in size than the gap which exists between each remaining inner and outer pairs of races in the bearing pack in the downhole direction toward the boring head.

3. A method of lubricating a bearing assembly for a rock housing used in a horizontal directional drilling apparatus, the method comprising the steps of:

providing a bearing assembly for a horizontal boring machine having a frame, a rotary machine supported on the frame, a drill string and a directional boring head, where the drill string has a first end, which is operatively connected to the rotary machine to drive the rotation of the drill string, and a second end, which is attachable to the directional boring head, the drill string itself being comprised of a plurality of lengths of dual-rod pipe which include passageways for conducting drilling mud to the directional boring head to cool the head and remove cuttings produced during drilling operations;

wherein a rock housing is located in the drill string at the second end thereof, the rock housing having an upper connecting end for connection in the drill string and an opposite, lower end, the lower end including a lower housing and a bearing mandrel bit box for connection to the directional boring head, the lower housing containing the bearing assembly and also being provided with an internal flow path for the passage of drilling mud;

wherein the bearing assembly is provided with special lubricant passageways formed within the bearing assembly which divert a portion of the flow of drilling mud passing through the drill string and through the rock housing to the directional boring head, the special passageways serving as a metering device for the flow of drilling mud through the bearing assembly; and wherein the bearing assembly is provided with a plurality of pairs of inner bearing races and a plurality of companion outer bearing races, the inner and outer bearing races having a plurality of bearing elements located therebetween, and wherein a first inner bearing race and its companion first outer bearing race are intentionally machined so that a predetermined gap exists between the first inner bearing race and the first outer bearing race when the first inner bearing race and the first outer bearing race are assembled with the bearing elements located therebetween, the gap between the first pair of inner and outer bearing races in the bearing pack being less than the gap which exists between any of the remaining inner and outer pairs of bearing races in the bearing pack.

4. The method of claim 3, wherein the size of the gap between the first inner race and its companion first outer race can be adjusted to provide a desired amount of back pressure which controls the amount of drilling mud that is allowed to pass through the bearing assembly, the remaining flow being encouraged to flow toward the boring head.

5. The method of claim 4, wherein the gap between the first inner race and its companion first outer race is less than about 0.015 inches between the first inner race and its companion first outer race.

6. The method of claim 5, wherein the bearing assembly is characterized by the absence of any type of sealed cavity containing oil or grease lubricant, but instead relies solely on the flow of drilling mud through the bearing assembly.

7. The method of claim 6, wherein the gap which exists between the first inner race and its companion first outer race is about 0.015 inches or less and the gap between the remaining pairs of races in the bearing pack is about 0.100 inches or more.

* * * * *